（12） United States Patent
Bouron et al.

(10) Patent No.: US 9,255,607 B2
(45) Date of Patent: Feb. 9, 2016

(54) SLEWING BEARING WITH A THROUGH-HOLE AND PLUG

(71) Applicants: Cyril Bouron, Puits de Courson (FR); Jean-Baptiste Magny, Chevannes (FR); Pascal Ovize, Chitry le Fort (FR)

(72) Inventors: Cyril Bouron, Puits de Courson (FR); Jean-Baptiste Magny, Chevannes (FR); Pascal Ovize, Chitry le Fort (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/337,138

(22) Filed: Jul. 21, 2014

(65) Prior Publication Data
US 2015/0023624 A1  Jan. 22, 2015

(30) Foreign Application Priority Data
Jul. 19, 2013 (EP) .................................... 13306040

(51) Int. Cl.
| | |
|---|---|
| F16C 33/58 | (2006.01) |
| F16C 19/06 | (2006.01) |
| F16C 43/06 | (2006.01) |
| F16C 19/22 | (2006.01) |
| F16C 19/36 | (2006.01) |

(52) U.S. Cl.
CPC .............. *F16C 33/583* (2013.01); *F16C 19/22* (2013.01); *F16C 43/06* (2013.01); *F16C 19/362* (2013.01); *F16C 33/581* (2013.01); *F16C 2300/14* (2013.01)

(58) Field of Classification Search
CPC ...... F16C 19/38; F16C 19/188; F16C 19/362; F16C 33/585; F16C 2300/14; F16C 43/06; F16C 33/58; F16C 19/06

USPC ......... 384/445, 507–508, 548, 550, 546–547, 384/559, 561, 622, 475, 511
See application file for complete search history.

(56) References Cited

U.S. PATENT DOCUMENTS

| | | | | |
|---|---|---|---|---|
| 1,174,541 | A * | 3/1916 | Bernheim | 384/508 |
| 3,275,391 | A * | 9/1966 | Blais | 384/447 |
| 4,568,205 | A * | 2/1986 | Basener | 384/501 |
| 4,606,654 | A * | 8/1986 | Yatsu et al. | 384/447 |
| 4,906,113 | A * | 3/1990 | Sague | 384/618 |
| 4,961,653 | A * | 10/1990 | Suzuki et al. | 384/447 |
| 5,026,177 | A * | 6/1991 | Masuda | 384/447 |
| 5,033,873 | A * | 7/1991 | Suzuki | 384/447 |
| 5,097,565 | A * | 3/1992 | Shorey | 384/607 |
| 5,104,239 | A * | 4/1992 | Sague | 384/560 |
| 2003/0098182 | A1 | 5/2003 | Ehler et al. | |
| 2012/0308169 | A1 | 12/2012 | Kuo et al. | |

FOREIGN PATENT DOCUMENTS

| | | | | |
|---|---|---|---|---|
| EP | 0375938 | A1 * | 7/1990 | F16C 19/18 |
| FR | 7123210 | | 6/1971 | |

(Continued)

*Primary Examiner* — Marcus Charles
(74) *Attorney, Agent, or Firm* — Bryan Peckjian; SKF USA Inc. Patent Dept.

(57) ABSTRACT

A slewing bearing having two rings and rollers arranged between the rings, wherein one of the rings is provided with a through-hole for inserting the rollers for assembly and maintenance, and with a plug for closing the through-hole. The through-hole is formed as a bore including an inner portion with a smaller bore diameter and an outer portion with a larger bore diameter. The smaller diameter portion is reduced in order to facilitate the assembly, while avoiding an increased diameter in the innermost part of the thorough hole in order to secure stability and robustness.

15 Claims, 3 Drawing Sheets

(56) References Cited

FOREIGN PATENT DOCUMENTS

| | | | | | |
|---|---|---|---|---|---|
| JP | 2000065080 A | * | 3/2000 | ............. | F16C 43/06 |
| JP | 2000170754 A | * | 6/2000 | ............. | F16C 19/36 |
| JP | 2002013540 A | * | 1/2002 | ............. | F16C 33/58 |
| JP | 2002021868 A | * | 1/2002 | ............. | F16C 33/58 |
| JP | 2007303657 A | * | 11/2007 | ............. | F16C 33/16 |
| JP | 2011106544 A | * | 6/2011 | ............. | F16C 43/06 |
| SU | 1318741 A | * | 6/1987 | ............. | F16C 19/04 |

* cited by examiner

SLEWING BEARING WITH A THROUGH-HOLE AND PLUG

CROSS-REFERENCE TO RELATED APPLICATIONS

This application claims priority to European Patent Application No. 13306040.0 filed Jul. 19, 2013, the contents of which are herein fully incorporated by reference.

FIELD OF THE INVENTION

The invention relates to a slewing bearing, wherein one of the rings is provided with a through-hole for inserting rollers in the course of assembly or maintenance.

BACKGROUND OF THE INVENTION

Slewing bearings are sometimes formed as large-scale bearings with diameters of several tens of centimeters up to meters, in particular in the form of tapered roller bearings. Rollers, preferably cylindrical rollers, may be inserted between the raceways using a through-hole in one of the rings, wherein the through-hole leads directly to a raceway of the ring. The rollers are usually pushed through the through-hole by hand using a finger or two fingers and the diameter of the through-hole is larger than the diameter of the rollers, preferably even larger than the largest distance between two opposing points on the rolling surfaces of the rollers, but at least 1.5 cm to 2 cm such that at least one finger of the assembly worker can be fitted in.

Once the assembly is completed, the through-hole is closed with a plug, and the plug may be fixed with a pin inserted into a small bore in a direction transverse to the through-hole.

A bearing of this type is disclosed e.g. in the document FR 7123270.

The axially inner surface of the plug forms a part of the raceway and completes the latter.

The above method of assembly is currently limited by the length of a finger of a worker and it is impossible to push the roller through the through-hole when the depth of the latter is considerably longer than the length of the finger, e.g. deeper than 7 cm to 9 cm. In the case of tapered raceways, the depth of the through-hole shall refer to the distance between an outer surface of the ring from which the through-hole extends inward to the point of intersection between the through-hole and the raceway which is closest to that outer surface.

SUMMARY OF THE INVENTION

The invention tries to overcome the above limitations of the convenient manual assembly method by providing a slewing bearing with a new structure.

The invention starts from a slewing bearing including two rings and rollers arranged between the rings, wherein one of the rings is provided with a through-hole for inserting the rollers upon assembly or maintenance and with a plug for closing the through-hole.

It is proposed that the through-hole is formed as a bore including an inner portion with a smaller bore diameter and an outer portion with a larger bore diameter.

The advantage of the invention is that the depth of the smaller diameter portion can be reduced as compared to a solution where the diameter is constant and corresponds to the smaller diameter portion for the entire depth of the through-hole and the latter feature may facilitate the assembly while avoiding an increased diameter in the innermost part of the through-hole and its intersection with the raceway. The area of intersection between the through-hole and the raceway should be kept small for reasons of stability and robustness.

Preferably, the dimensions of the outer portion and of the inner portion should be chosen such that the assembly of the bearing can be achieved by hand, i.e. the minimum diameter of the inner portion should be 1.5 cm or more, preferably 2 cm or more, the depth of the inner portion measured between the outermost point of the intersection between the inner portion and the raceway should be 9 cm or less, preferably 7 cm or less and the diameter of the outer portion should be such that at least one other finger of a human hand i.e. the index or middle finger is fitted into an inner portion of the through-hole when being bent, i.e. 8 cm or more.

The above description of the invention as well as the appended claims, figures and the following description of preferred embodiments of the invention show multiple advantageous features of the invention in specific combinations. The skilled person will easily be able to consider further combinations or sub-combinations of these features in order to adapt the invention as defined in the claims to his or her specific needs.

DETAILED DESCRIPTION OF THE EMBODIMENTS

Figure 1:
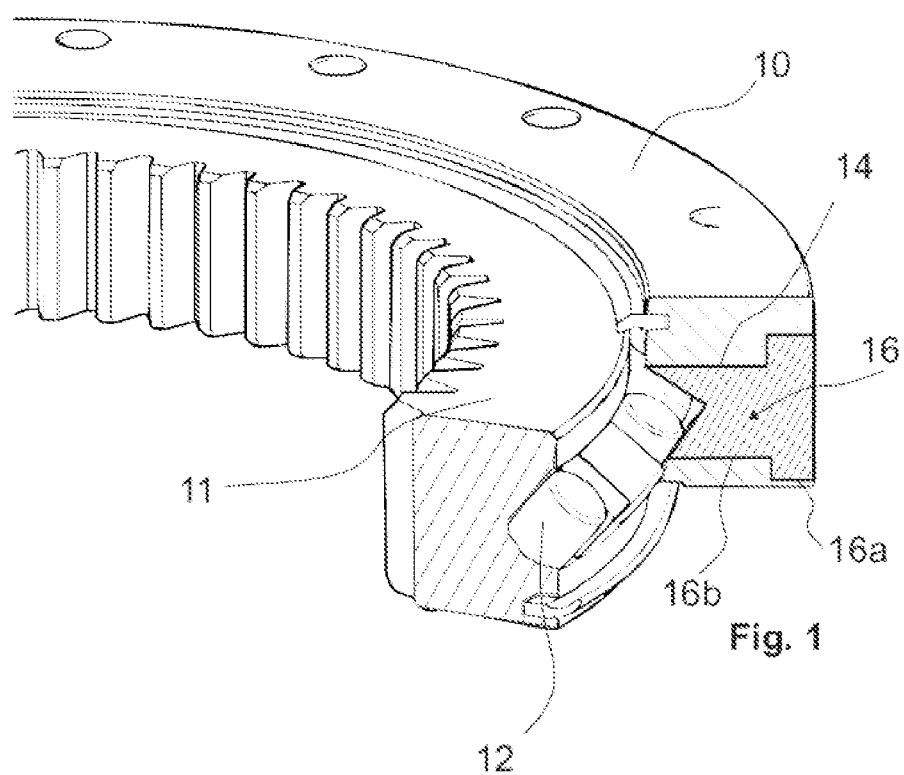
FIG. 1 is a schematic view of a slewing bearing according to the invention.

FIG. 1 illustrates the outer ring 10 of a slewing bearing according to the invention. Besides of the outer ring 10, the slewing bearing comprises an inner ring 11 and rollers 12 arranged between the inner ring 11 and the outer ring 10 so as to roll on tapered raceways of the inner ring 11 and the outer ring 10, respectively.

A through-hole 14 is provided in the outer ring 10 and has a diameter such that the rollers 12 can be fitted through the through-hole 14 into a space between the outer ring 10 and the inner ring 11 during the assembly. Further, the through-hole 14 may serve to take the rollers 12 out of the bearing for maintenance, replacement of rollers or the like.

Once all the rollers 12 are inserted, the through-hole 14 is closed by a plug 16.

The plug 16 is inserted in the through-hole 14 when the raceways are machined such that the end face of the plug 16 forms a part of the raceway in the assembled configuration. The plug end face may be configured flush with a rolling surface of one of the rings in such a way that the roller surface and the end face of the plug combine to form a continuous surface. Alternatively, or in combination, the plug may have a head portion which is configured flush with an external surface of one of the rings in such a way that the external surface and the head portion combine to form another continuous surface.

As illustrated in FIG. 1 the plug 16 comprises a head portion 16a with a larger diameter and an inner portion 16b with a smaller diameter which is concentric to the head portion 16a. As illustrated in more detail in FIG. 4, the through-hole 14 has a configuration mating with the shape of the plug 16 and has an inner portion 14b with a smaller diameter and an outer portion 14a with a larger diameter, wherein the outer portion 14a is formed as a counter bore of the inner portion 14b and arranged concentrically to the inner portion 14b.

Figure 2:
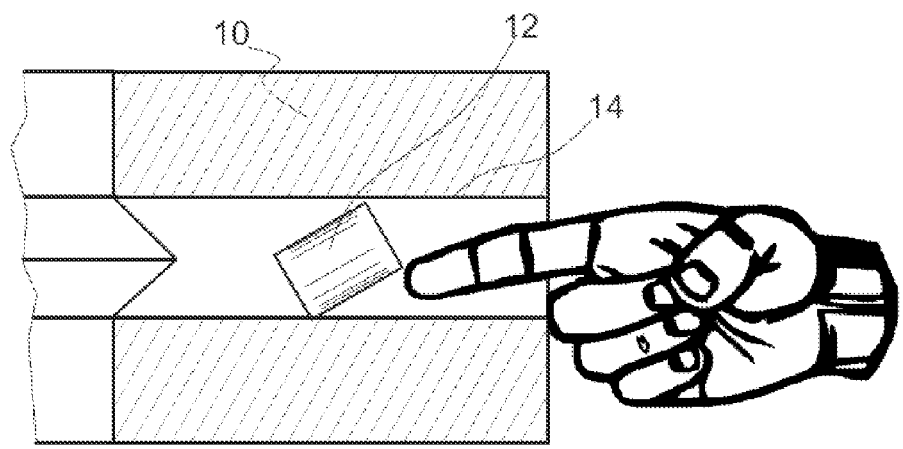
FIG. 2 is a schematic view illustrating an assembly step of a slewing bearing according to the prior art.

The reason for this configuration is illustrated in FIG. 2, which shows an assembly procedure according to the prior art wherein the through-hole 14 has, in contrast to the invention, a constant diameter over its entire depth.

When the assembly worker tries to push the roller 12 through the through-hole 14, using his index, his ring finger or little finger may collide with the edge of the through-hole 14 and the worker may be unable to push the roller 12 further inwards. The depth up to which the roller 12 may be pushed inwards is essentially limited to the length of the index finger of the worker, i.e. to around 8 cm.

Figure 3:
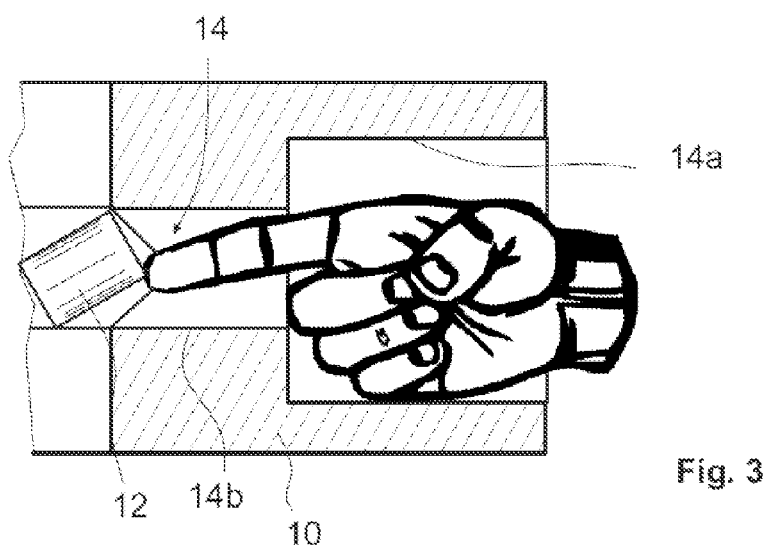
FIG. 3 is a schematic view of the assembly step corresponding to a slewing bearing according to the invention.

The larger diameter portion 14a of the through-hole 14 according to the invention (FIG. 3) avoids this collision and the radius of the outer portion 14a of the through-hole 14 essentially corresponds to the distance between the index and the little finger of the hand in the configuration as illustrated in FIG. 3, i.e. around 7 cm to 8 cm, whereas the radius of the inner portion and the embodiment of FIG. 3 is around 2 cm to 3 cm and chosen such that the roller 12 in an inclination corresponding to the taper angle of the raceways may be fitted through the through-hole 14.

Figure 4:
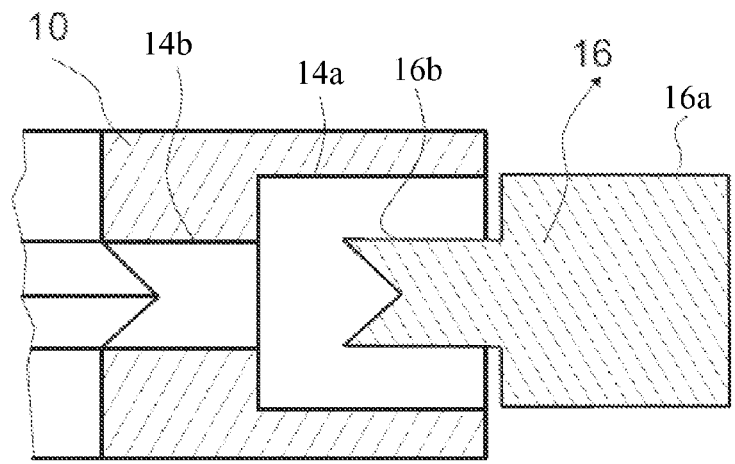
FIG. 4 is a cross-sectional view of a ring of a slewing bearing according to the invention with a plug being fitted into a though-hole.
Figure 5:
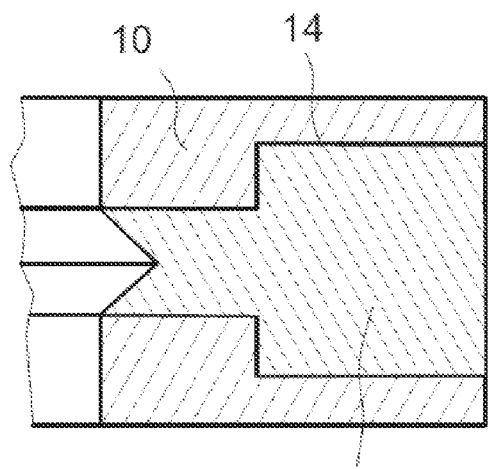
FIG. 5 is a cross-sectional view of a ring of a slewing bearing according to the invention with a plug in its assembled configuration.

After completion of the assembly, the through-hole 14 is closed with a plug 16 as illustrated in FIG. 4 and the plug 16 may be fixed with any suitable means, e.g. with a pin or screw, welding or the like.

The invention claimed is:

1. A slewing bearing having two rings and rollers arranged between the rings, one of the rings provided with a through-hole for inserting the rollers for assembly and maintenance, and including a plug for closing the through-hole, the plug having an end face configured flush with a rolling surface of one of the rings such that the roller surface and the end face of the plug combine to form a continuous surface, wherein
the through-hole is formed as a bore including an inner portion having a smaller bore diameter and an outer portion having a larger bore diameter, wherein a radial length of the outer portion is greater than a radial length of the inner portion.

2. The slewing bearing according to claim 1, wherein the radial length of the inner portion is between 5 cm and 8 cm.

3. The slewing bearing according to claim 1, wherein the bore diameter of the outer portion is at least 8 cm.

4. The slewing bearing according to claim 1, wherein the bore diameter of the inner portion is at least 2 cm.

5. The slewing bearing according to claim 1, wherein the inner portion and the outer portion (14b) are concentrical bores.

6. The slewing bearing according to claim 1, wherein the plug has an inner portion that fits within the inner portion of the bore and the head portion fits within the outer portion of the bore, wherein the diameters of the inner portion and head portion correspond to the diameters of the inner and the outer portion of the bore respectively.

7. The slewing bearing according to claim 1, wherein the inner end face of the plug is provided with a part of a raceway of the bearing.

8. The slewing bearing according to claim 1, wherein the bore diameter of the outer portion is at least two times larger than the bore diameter of the inner portion.

9. The slewing bearing according to claim 1, wherein the plug is free from lubricant passageways therein.

10. The slewing bearing according to claim 1, wherein a head portion of the plug is configured to be flush with an external surface of one of the rings such that the external surface and the head portion combine to form a continuous surface.

11. A slewing bearing having two rings and rollers arranged between the rings, one of the rings provided with a through-hole for inserting the rollers for assembly and maintenance, and including a plug for closing the through-hole, the plug having a head portion configured flush with an external surface of one of the rings such that the external surface and the head portion combine to form a continuous surface, wherein
the through-hole is formed as a bore including an inner portion having a smaller bore diameter and an outer portion having a larger bore diameter, wherein the bore diameter of the outer portion is at least two times larger than the bore diameter of the inner portion, an interface between the outer portion and the inner portion forming a rectilinear shoulder.

12. The slewing bearing according to claim 11, wherein a radial length of the outer portion is greater than a radial length of the inner portion.

13. A method of assembling a slewing bearing, comprising:
providing an inner ring;
providing an outer ring wherein the inner and outer ring are configured to have a roller disposed therebetween, the outer ring being configured to define a through-hole configured for inserting the roller therethrough using a hand, the through-hole comprising a radially inner portion having a first diameter and a radially outer portion having a second diameter which is greater than the first diameter, wherein a radial length of the outer portion is greater than a radial length of the inner portion such that the outer ring and the through-hole are configured for a finger on the hand to push the roller through the radially inner portion while a remainder of the hand is located inside the radially outer portion;
inserting a roller through the through-hole; and
inserting a plug into the through-hole such that the plug results in any interior raceway of the outer ring having a continuous raceway surface.

14. The method of claim 13, wherein the step of providing the outer ring further comprises the second diameter being at least twice as large as the first diameter.

15. The method of claim 14, wherein the step of inserting the plug further comprises the plug being free of any lubricant passageways for communicating lubricant through an inside of the plug.

* * * * *